Feb. 13, 1945.   C. A. FURTWANGLER   2,369,451
METAL BAND SAW
Filed Feb. 15, 1943
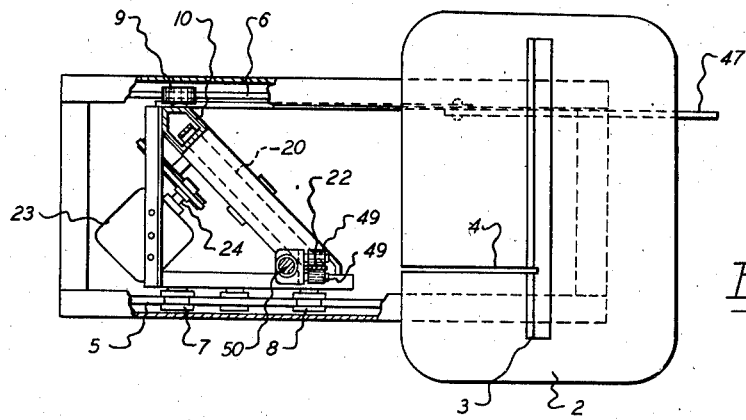
Fig. 2.
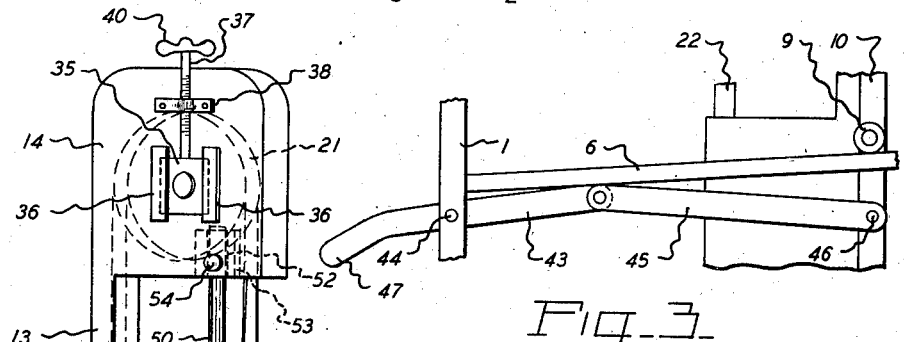
Fig. 3.
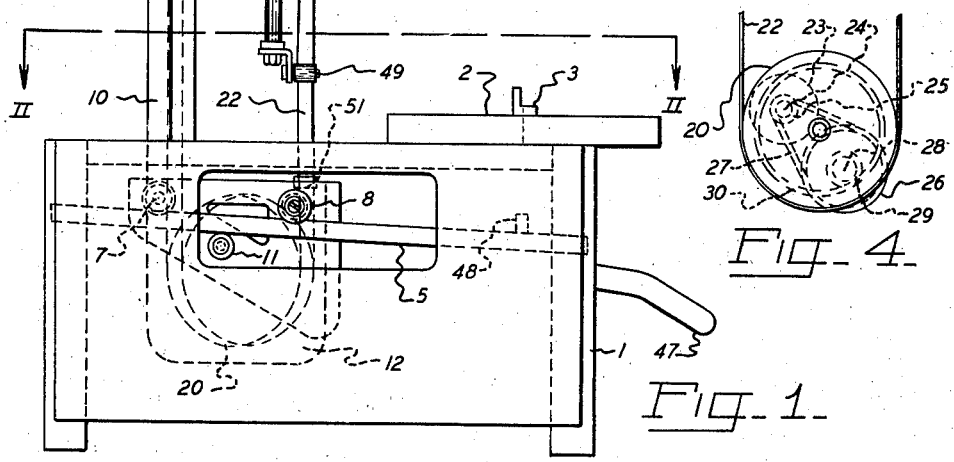
Fig. 4.
Fig. 1.
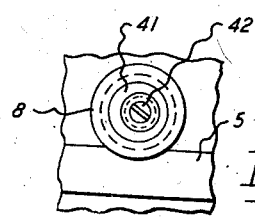
Fig. 5.
Inventor
CARL A. FURTWANGLER
By Beaman & Langford
Attorneys Patented Feb. 13, 1945

2,369,451

UNITED STATES PATENT OFFICE 2,369,451

METAL BAND SAW

Carl A. Furtwangler, Parma, Mich.

Application February 15, 1943, Serial No. 475,924

6 Claims. (Cl. 29—68)

The present invention relates to saws and more particularly to metal cutting band saws.

Prior art metal cutting band saws either are fed into work positively or swing downwardly under the action of gravity toward a substantially horizontal position. A positive feed is undesirable because of variations in the cutting capacity of a saw depending upon the sharpness of the teeth and depending upon the hardness of the metal being cut. A single piece of metal may vary in hardness from one portion thereof to another. Saws fed downwardly into a substantially horizontal position by gravity have the disadvantage that the degree of pressure applied varies with the angle of the saw, with respect to the work and also the rate of cutting of the saw varies with the distance of the work from the pivotal axis of the saw. The present invention constitutes an improvement over the prior art structures in that the saw is fed in positively, yet with a uniform force and with a uniform cutting rate over the entire piece of material being cut. This result is achieved by employing a vertically traveling band saw blade moved against work by the gravitational movement of the saw carrying frame down an inclined track.

An object of the present invention is to provide a band saw with an impositive feed which operates with uniform pressure and at a uniform rate of cut over the entire piece of work being cut.

Another object of the invention is to provide a band saw having the blade thereof traveling in a vertical path.

Still another object of the invention is to provide a band saw having the blade thereof traveling in a vertical path and fed by the gravitational movement of its support down an inclined track.

A further object of the invention is to provide a band saw with a support consisting of a pair of pulleys, one arranged above the other, the pulleys being mounted on a frame supported for gravitational movement along an inclined track to feed the saw toward work to be cut.

These and other objects residing in the arrangement, combination and construction of the parts will be apparent from the following specification when taken with the accompanying drawing, in which Fig. 1 is a side elevation of a band saw according to the present invention, Fig. 2 is a section on the line II—II of Fig. 1, Fig. 3 is a side elevation of a part of the opposite side of the structure from that shown in Fig. 1, showing a detail of the mechanism, Fig. 4 is an elevation of a detail showing the saw driving mechanism, and Fig. 5 is an enlarged elevation of one of the saw frame supporting wheels which is eccentrically mounted for providing adjustment for the angle of the saw blades.

Referring particularly to the drawing, the reference character 1 indicates a main frame having a work table 2 provided with a suitable work stop 3. Arranged in the table 2 is a slot 4 for permitting passage of the saw through the table 2 as it moves against work disposed on the table 2. The tracks 5 and 6 are secured to sides of the table 2 and extend rearwardly therefrom in parallel relation to each other.

There is mounted on the tracks 5 and 6 by means of wheels 7, 8 and 9, a saw frame 10. The saw frame 10 is provided with a roller 11 which engages the underside of the track 5 to hold the frame 10 against raising from the tracks 5 and 6. The frame 10 is provided with a base portion 12, a post portion 13 projecting upwardly from the base portion 12, and an upper portion 14, supported by the post portion 13.

The base portion 12 and the upper portion 14 have pulleys 20 and 21 suitably mounted thereon for rotation. An endless band saw 22 is disposed around the pulleys 20 and 21. The lower pulley 20 is driven by an electric motor 23 having a shaft 24. The shaft 24 has a pulley 25 secured thereto which drives a pulley 26 through a belt 27. The pulley 26 is mounted on the shaft 28, suitably supported with respect to the base frame 12 and is provided with a pinion 29 meshing with an internal ring gear 30 on the pulley 20.

In order to facilitate the replacing of saws 22, the upper pulley 21 is mounted upon a suitable member 35 guided for vertical movement in ways 36. A screw 37 threaded in a bracket 38 is swivelly secured to the member 35 so that rotation of the screw 37 by its handle 40 results in raising and lowering the pulley 21 to tighten or loosen the saw 22.

The frame 10 is given a three point mounting by the wheels 7, 8 and 9. Lateral movement of the frame 10 is restrained by the fact that the pulleys 7 and 8 are grooved and straddle the track 5. The wheels 7 and 9 are on the same lateral axis, and the frame 10 may be rocked about this axis to adjust the vertical alignment of the saw 22 by suitable manipulation of the eccentrically mounted wheel 8. The wheel 8 is mounted for rotation about an eccentric 41 secured by a pin 42 to the base frame 12. By adjusting the position of the eccentric, the vertical adjustment of the wheel 8 is varied with the result that the frame 10 may be rocked as desired about the axis of the wheels 7 and 9 to adjust the saw 22 into vertical position.

The frame 10 normally tends to roll down the tracks 5 and 6 due to the action of gravity. When the saw is not in use, it is maintained at the upper end of the tracks 5 and 6 by a toggle linkage consisting of an arm 43 pivoted at 44 to the frame 1, and an arm 45 pivoted at 46 to the saw frame 10. As will be apparent from Fig. 3 the toggle linkage is directly below the track 6, and is so arranged that the track 6 serves as a stop to limit upward movement of the toggle past its dead center position. The arrangement is further such that the upper movement of the toggle linkage is only slightly past its dead center position. In this position the saw frame 10 is maintained held against moving down the tracks 5 and 6 under the action of gravity.

The operation of the saw is as follows: Work to be sawed is placed on the table 2 and abutted against the stop 3 thereon. The motor 23 is started and the handle 47 of the toggle linkage is raised to move the toggle linkage through its dead center position downwardly, with the result that the saw carriage 10 starts to move down the tracks 5 and 6 under the action of gravity. Since there is nothing to prevent the collapse of the toggle consisting of the arms 43 and 45, the saw carriage 10 will move downwardly moving the blade 22 through the slot 4 in the table 2 and against the work thereon. The direction of rotation of the saw should be such that it moves downwardly with the teeth set for downward cutting action. By manipulation of the handle 47, the saw 22 may be eased into engagement with the work on the table 2 and caused to cut the same. To limit the forward movement of the saw 22, a suitable stop 48 is provided on the track 7 so that the saw 22, when it has finished cutting the work, will not cut the table 2 or the stop 3 thereon. The saw above described has the particular advantage that the force urging the saw against the work is uniform due to the forward gravitational movement of the saw frame 10, and also is flat against the work, cutting all parts of the work along the cutting edge of the saw at a uniform rate.

As shown, the plane of the pulleys 20 and 21 is at an angle to the path of movement of the saw 22 to and from work on the table 2. The operative portion of the saw 22 is maintained in parallel alignment with the tracks 5 and 6 and thus the path of movement of the blade 22 by guiding rollers 49 above the work secured to an adjustable standard 50, and rollers 51 secured to the frame 1 below the work. The rollers 49 and 50 are disposed on opposite sides of the saw 22 respectively. The standard 50 is slidable in ways 52 in a bracket 53 secured to the upper saw frame portion 14. The vertical position of the rollers 49 may be adjusted by manipulation of the thumb screw 54 provided for clamping the standard 50 in the ways 52 and sliding the standard 50 in the ways 52 as desired. It will be understood that it is desirable to adjust the height of the rollers 49 depending upon the height of the work being cut.

Having thus described my invention, what I desire to secure by Letters Patent and claim is:

1. A gravity feed band saw comprising a fixed frame, a pair of parallel inclined tracks in said fixed frame, a narrow upright frame angularly disposed to said tracks, upper and lower spaced wheels disposed in the same plane and supported in said upright frame, a band saw running over said wheels, means for driving said lower wheel supported in the lower portion of said upright frame, and antifriction means for supporting said upright frame for travel along said inclined tracks, said antifriction means being supported at points intermediate the upper and lower portions of said upright frame to increase the stability thereof upon said tracks.

2. A saw of the character described comprising a main frame, a saw frame, a saw, means mounting said saw for actuation on said saw frame, a fixed inclined track on said main frame, antifriction means mounting said saw frame on said track, whereby said saw frame and saw thereon tend to move down said track under the action of gravity to feed said saw against work to be sawed, a toggle pivotally connecting said frames, and means limiting over center movement of said lever in one direction to cause said toggle to hold said saw frame upwardly of said track, whereby when said toggle is moved over center in the opposite direction said saw frame may move under gravity down said track.

3. A saw of the character described comprising a main frame, a saw frame, a saw, means mounting said saw for actuation on said saw frame, a fixed inclined track on said main frame, antifriction means mounting said saw frame on said track, whereby said saw frame and saw thereon tend to move down said track under the action of gravity to feed said saw against work to be sawed, a lever pivoted to said main frame, a lever pivoted to said saw frame, means pivoting said levers together, and a stop for limiting pivotal movement of said levers in one direction when said means pivoting said levers together is slightly at one side of its position when said levers are in alignment, said levers when substantially in alignment holding said saw frame at the upper end of said track, whereby said levers when movement thereof is limited by said stop hold said saw away from work and when over center away from said stop permit said saw to move by gravity against work.

4. A saw of the character described comprising a main frame, a saw frame, an endless band saw, a pair of pulleys mounted on said saw frame for mounting said saw, a fixed inclined track on said main frame, antifriction means mounting said saw frame on said track, whereby said saw frame and saw thereon tend to move down said track under the action of gravity to feed said saw against work to be sawed, a toggle pivotally connecting said frames, and means limiting over center movement of said lever in one direction to cause said toggle to hold said saw frame upwardly of said track, whereby when said toggle is moved over center in the opposite direction said saw frame may move under gravity down said track.

5. A saw of the character described comprising a main frame, a saw frame, an endless band saw, a pair of pulleys mounted on said saw frame for mounting said saw, a fixed inclined track on said main frame, antifriction means mounting said frame on said track, whereby said saw frame and saw thereon tend to move down said track under the action of gravity to feed said saw against work to be sawed, a lever pivoted to said main frame, a lever pivoted to said saw frame, means pivoting said levers together, and a stop for limiting pivotal movement of said levers in one direction when said means pivoting said levers together is slightly at one side of its position when said levers are in alignment, said levers when substantially in alignment holding said saw frame at the upper end of said track, whereby said levers when movement thereof is limited by said stop hold said saw away from work and when over center away from said stop to permit said saw to by gravity move against work.

6. A band saw of the character described comprising an endless band saw, means mounting said saw for operation with the operative portion thereon in substantially vertical position, a fixed inclined track, wheels mounting said saw mounting means on said track, said wheels comprising two wheels having the axes thereof in alignment and a third wheel having its axis parallel and spaced from the axes of said first named wheels, an eccentric mounting said last named wheel whereby adjustment of the eccentric adjusts the distance of the axis of said last named wheel from said track and thus adjusts the vertical position of said saw, and means to actuate said saw while being moved against work, whereby said saw and mounting means therefor tend to move down said track under the action of gravity to feed said saw against work to be sawed.

CARL A. FURTWANGLER.